Nov. 25, 1952 S. J. GARTNER 2,618,904
GLASS HEADER MANUFACTURING MACHINE
Filed Dec. 12, 1945 9 Sheets-Sheet 1
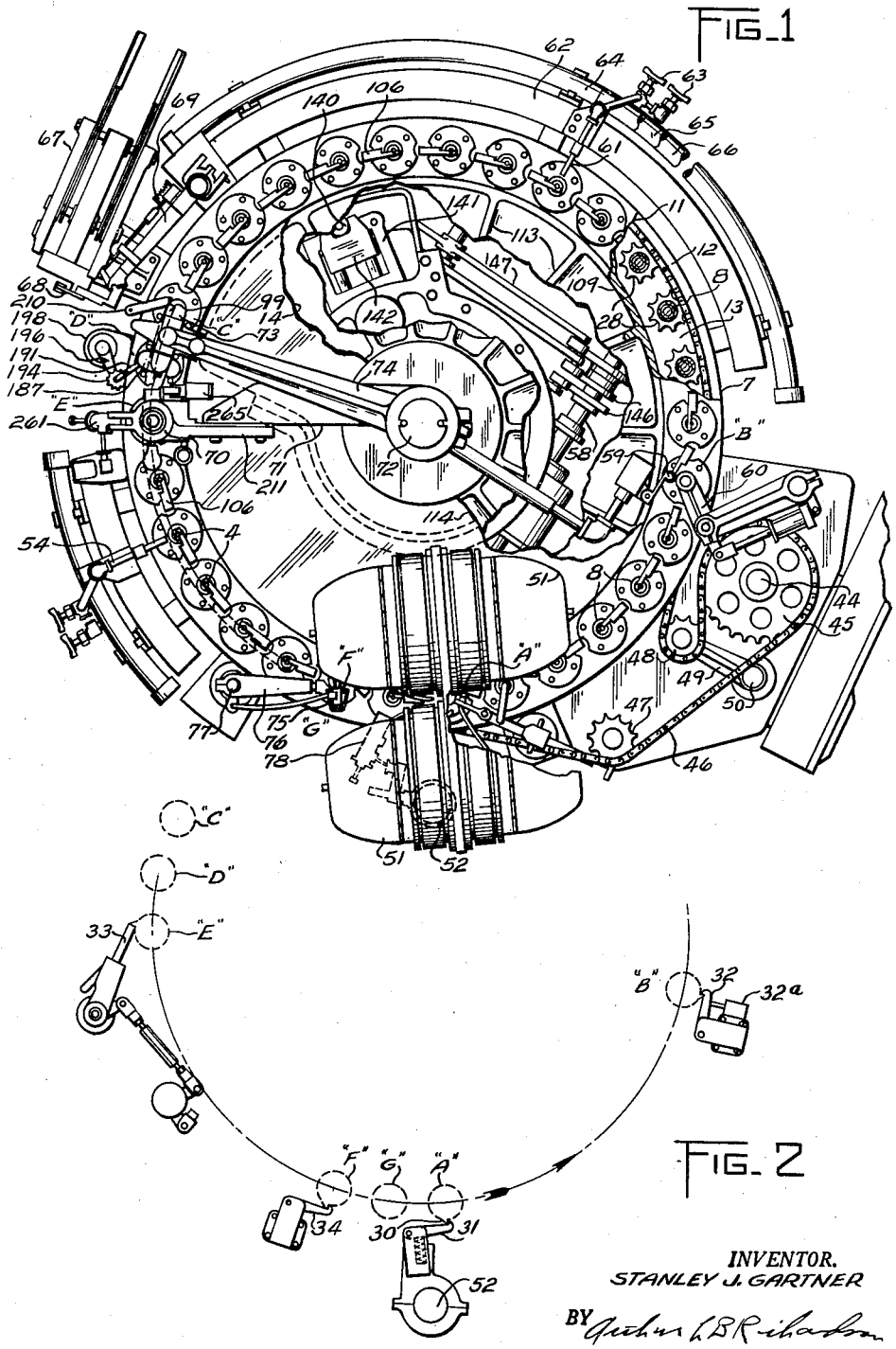
INVENTOR.
STANLEY J. GARTNER
BY
HIS ATTORNEY

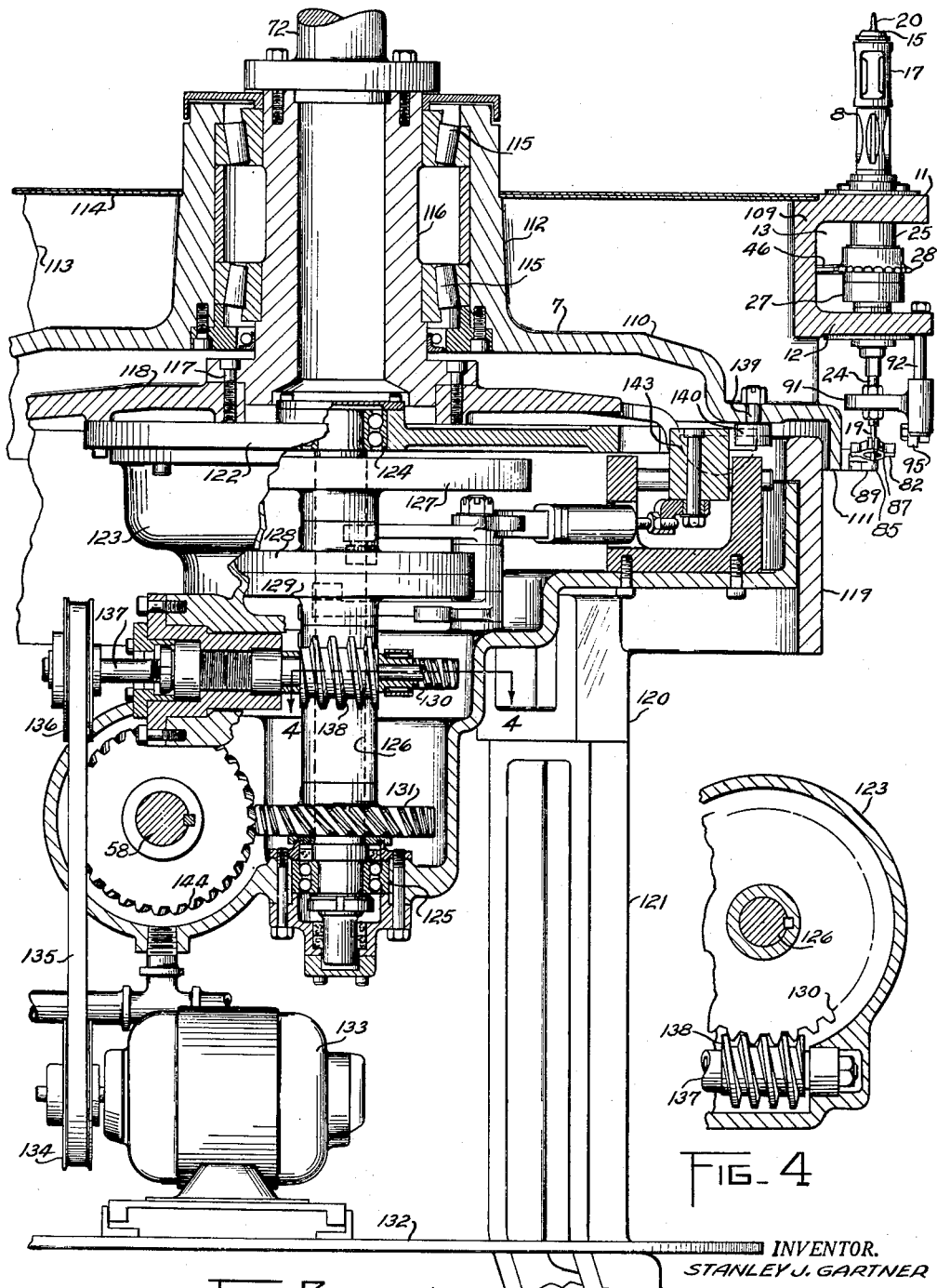

Nov. 25, 1952 — S. J. GARTNER — 2,618,904
GLASS HEADER MANUFACTURING MACHINE
Filed Dec. 12, 1945 — 9 Sheets-Sheet 3
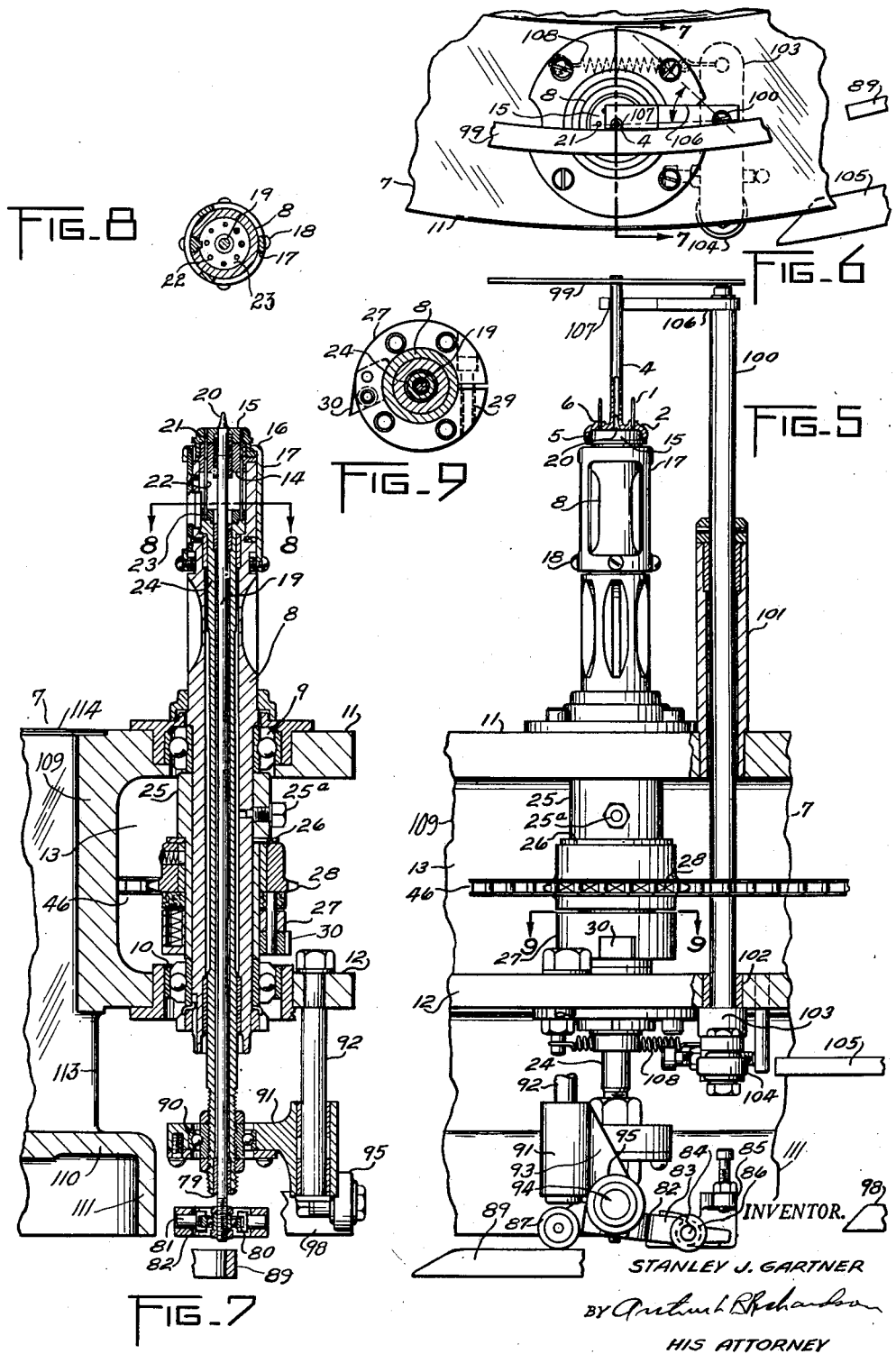
INVENTOR.
STANLEY J. GARTNER
BY Arthur B Richardson
HIS ATTORNEY Nov. 25, 1952 — S. J. GARTNER — 2,618,904
GLASS HEADER MANUFACTURING MACHINE
Filed Dec. 12, 1945 — 9 Sheets-Sheet 4
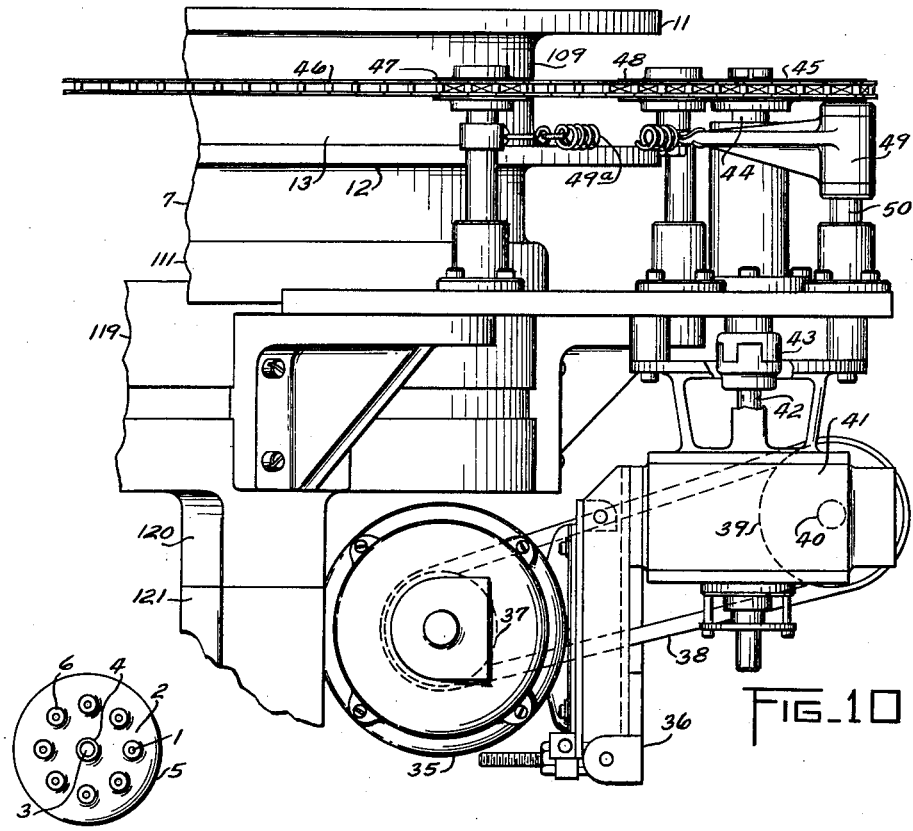
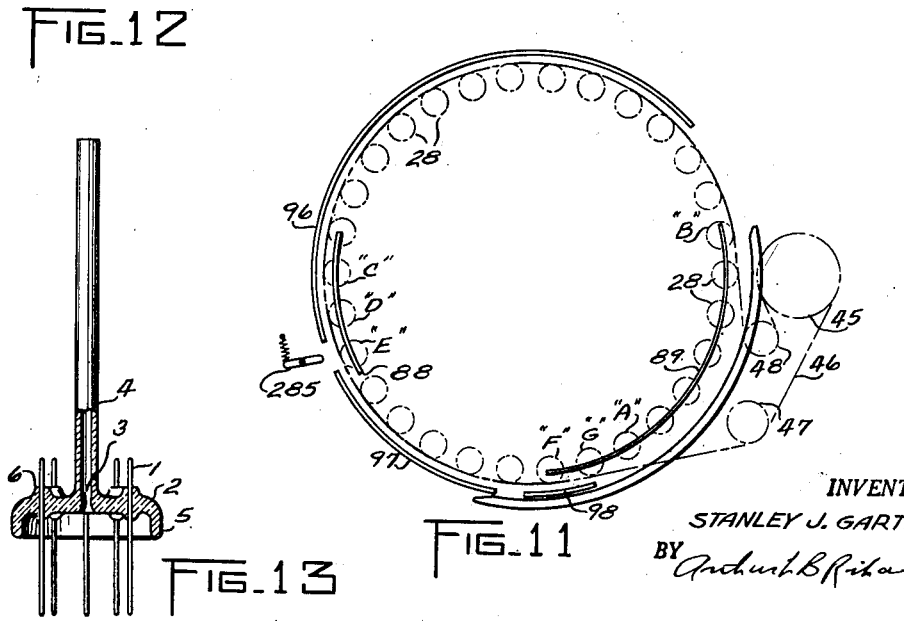
INVENTOR.
STANLEY J. GARTNER
HIS ATTORNEY Nov. 25, 1952     S. J. GARTNER     2,618,904
GLASS HEADER MANUFACTURING MACHINE
Filed Dec. 12, 1945     9 Sheets-Sheet 5

INVENTOR.
STANLEY J. GARTNER
BY
HIS ATTORNEY

Nov. 25, 1952 S. J. GARTNER 2,618,904
GLASS HEADER MANUFACTURING MACHINE
Filed Dec. 12, 1945 9 Sheets-Sheet 6
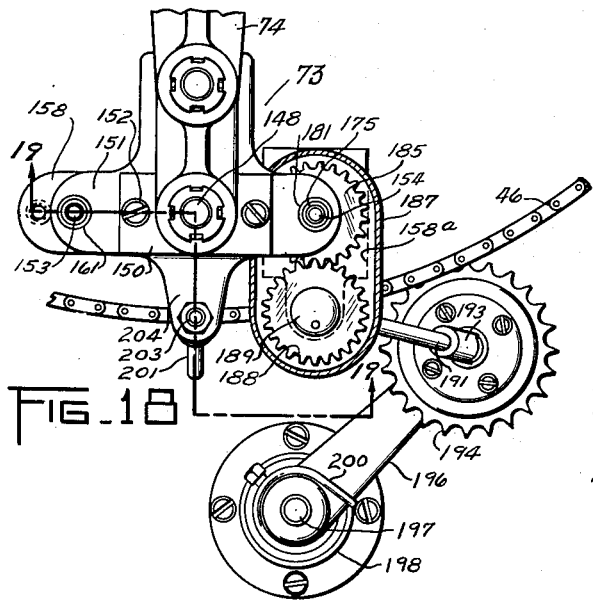
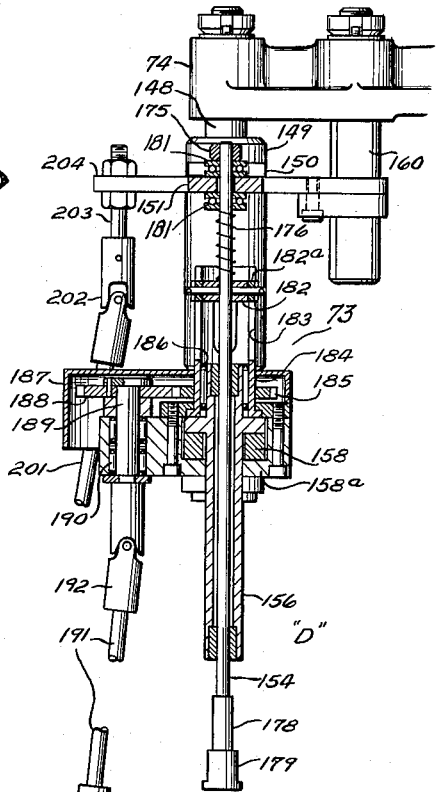
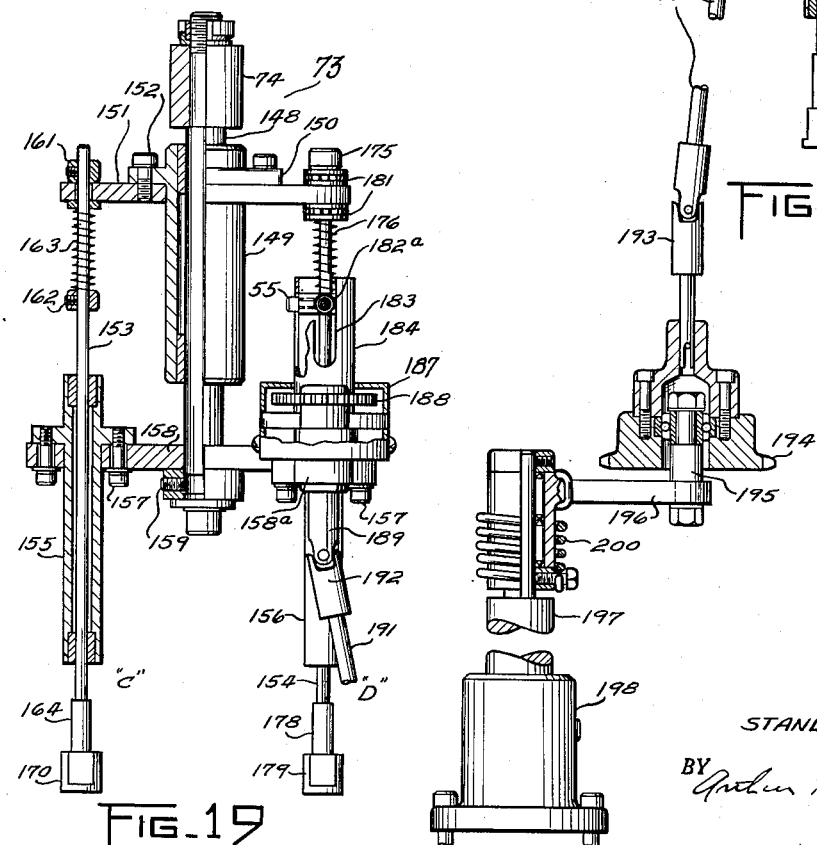
INVENTOR.
STANLEY J. GARTNER
BY
HIS ATTORNEY

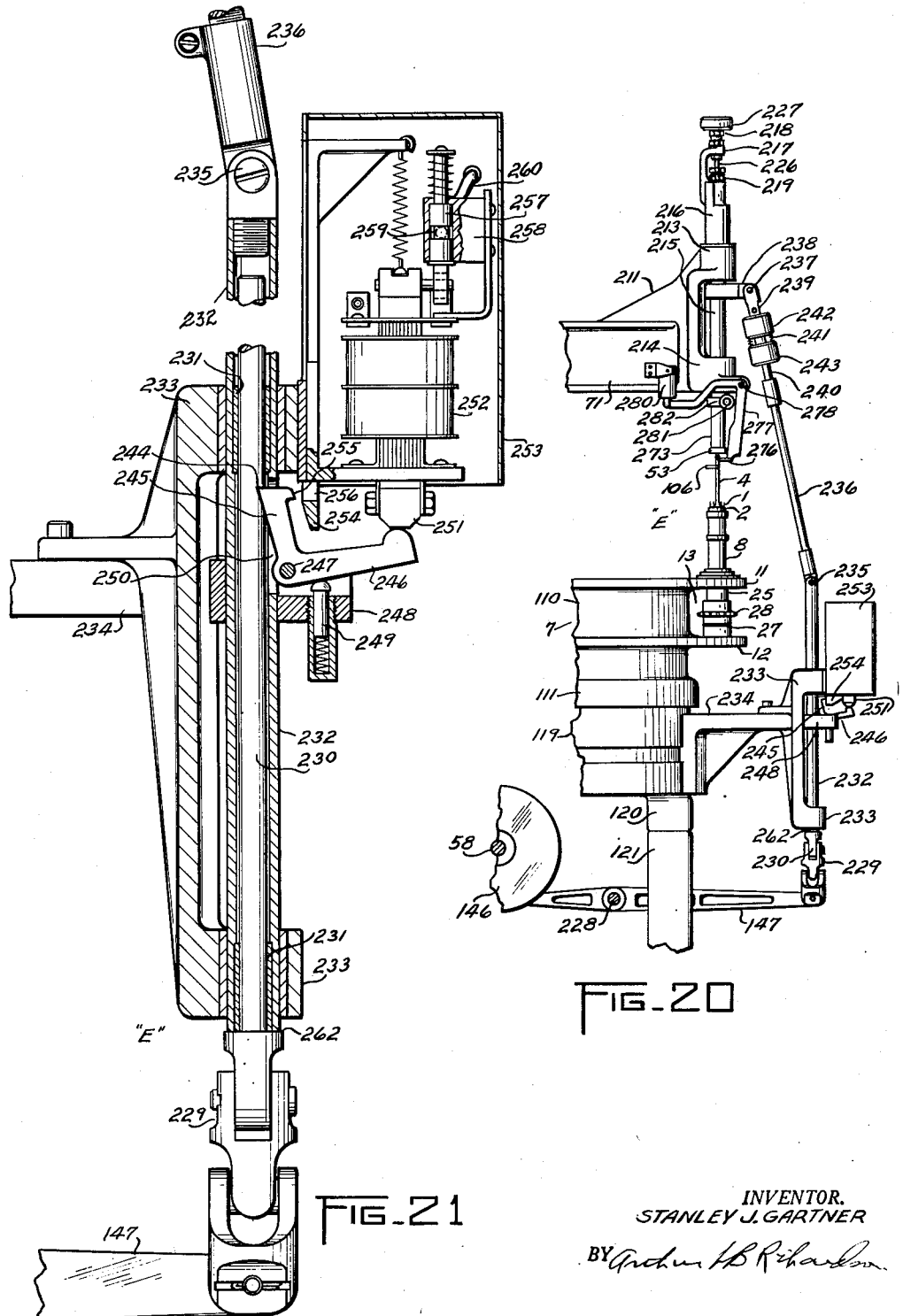

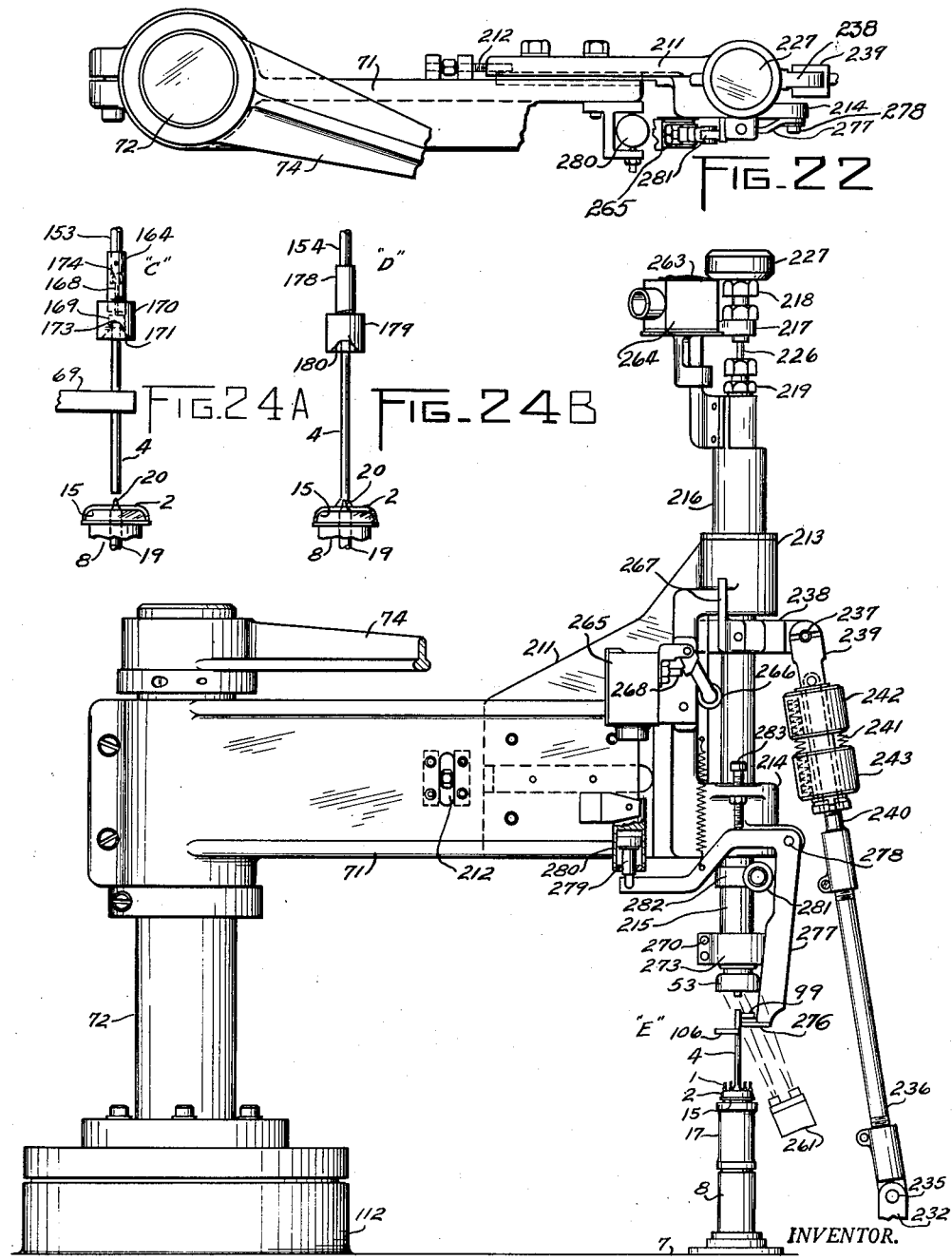

Nov. 25, 1952 S. J. GARTNER 2,618,904
GLASS HEADER MANUFACTURING MACHINE
Filed Dec. 12, 1945 9 Sheets-Sheet 9
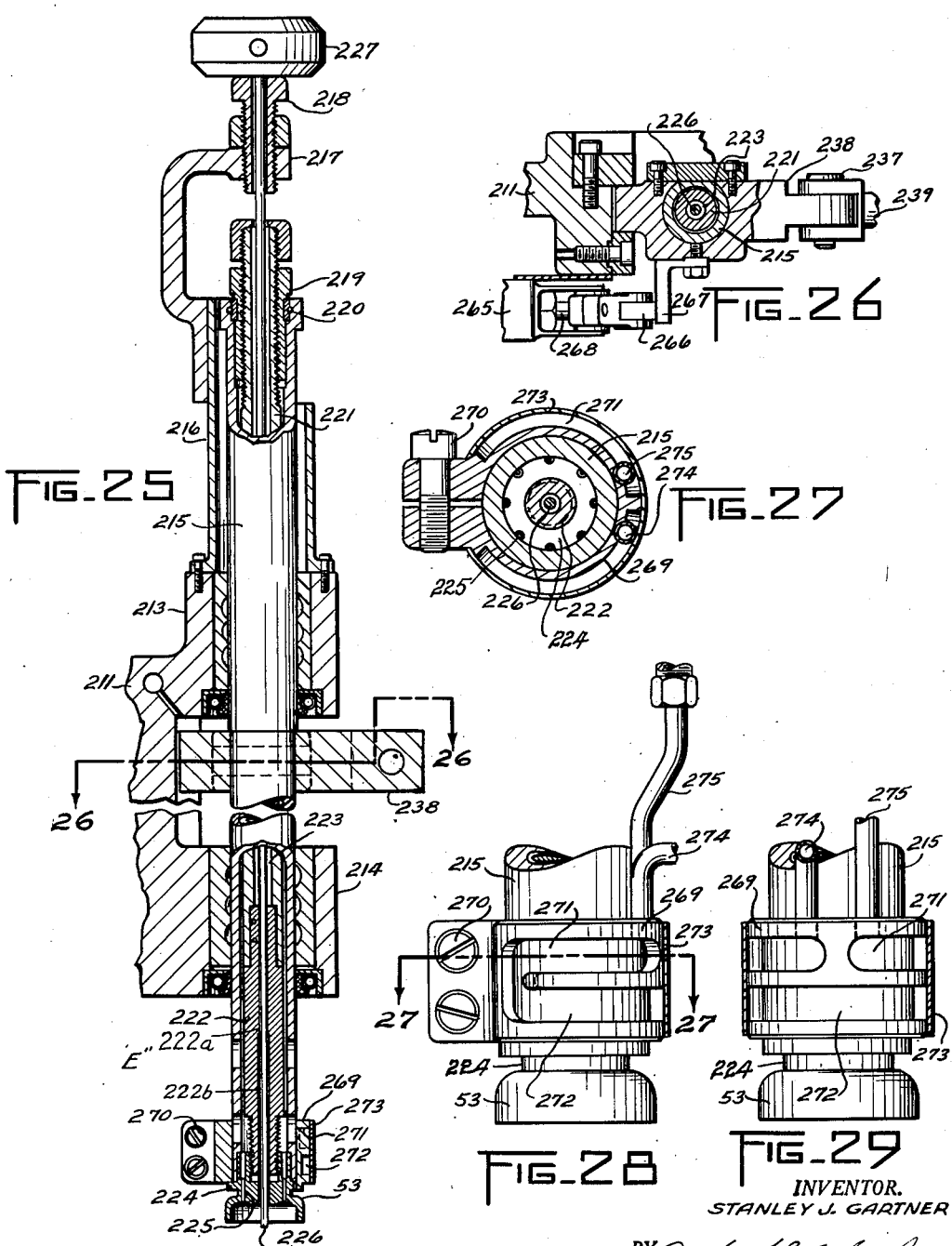
INVENTOR.
STANLEY J. GARTNER
BY
HIS ATTORNEY Patented Nov. 25, 1952

2,618,904

UNITED STATES PATENT OFFICE 2,618,904

GLASS HEADER MANUFACTURING MACHINE

Stanley J. Gartner, Emporium, Pa., assignor to Sylvania Electric Products, Inc., a corporation of Massachusetts Application December 12, 1945, Serial No. 634,420

16 Claims. (Cl. 49—2)

The present invention relates to the manufacture of glass envelopes such as lamp bulbs, vacuum tubes and the like, and more particularly to automatically operable means for joining a small, glass exhaust tubing to the cap or terminal carrying header which, in complete assembly of the product, becomes an end closure for a vacuum tube.

As herein shown and described the invention embodies a press and so-called prepress or stem setting members of an automatic machine used in the radio industry for making headers of the character just above referred to. Such a machine includes a work table or carrier in the form of a turret mounted to rotate about a vertical axis and on which is a plurality of vertically extending spindles regularly spaced in a circle concentric with the turret and adjacent its outer peripheral edge. These spindles are independently rotatable about their own axes but have a driving connection common to all of them, while rotation of the turret is by other means which includes indexing mechanism for effecting its regular intermittent angular movement through an arc equal to the angular spacing of the spindles.

During each cycle the turret traverses a plurality of stations at predetermined ones of which different operations are performed and where the spindles are independently locked against rotation, these operations and the mechanism for accomplishing them being, in the present instance, substantially as follows:

It should first be understood that on the upper end of each spindle is a cap piece or lower mold having a central aperture for receiving a rod mounted for reciprocating movement in the spindle, that surrounding the central aperture is a plurality of regularly spaced smaller holes for receiving lengths of wire or terminal pins to be embedded in the header and form an integral part thereof, and that these molds independently and successively mate with an upper mold on the press member to be hereinafter described.

At a first station terminal pins are automatically dropped into the small apertures of the lower mold and extend upwardly therefrom. Then, as the spindles traverse a loading zone glass wafers having a central opening and smaller openings registering with those in the mold are manually placed on the molds with the pins extending therethrough. At a further station mechanism operates to remove the pins from any mold on which the operator has failed to place a wafer. Thereafter during the traverse of the spindles the wafers are subjected to flames from high-heat burners for the purpose of fusing the metal terminals to the glass and for softening the glass so that when the spindles successively reach the stem loader the glass is in condition for a stem of glass tubing being joined thereto. This is the station where the mechanism of the present invention begins to function, an object of the invention being the provision of the hereinabove mentioned prepress or stem setting means with two head members mounted to reciprocate in unison, one head cooperating with the spindle at the stem loading station to press the stem downward and locate it in true axial alignment with the spindle and on the tip end of the axially movable spindle rod, while the other head is acting on the next preceding stem to force it into the central aperture of the softened glass wafer.

Another and very important object of the invention is to accomplish the aforesaid setting of the stems while the spindles are rotating and without the stems being subjected to torsional strains which would cause them to be twisted off the wafers.

During operation of the prepress a press member is functioning at another station, preferably the second intermittent stop beyond the stem loading station, to mold the glass wafer so as to provide reinforcement around the terminal pins and give it shape where the tubing is joined thereto. In this molding operation the glass stem is telescoped by the member supporting the press or upper mold and a further object of the invention is to provide means for automatically stopping the press in the event a stem is too long or one is broken off in the telescoping member and is jammed upwardly by the stem on the next spindle when moved into operative position under the press and the press starts its downward movement.

A further object of the invention is the provision of a simple stripper or knockout for glass jammed into the press in the manner just above mentioned.

The machine employs an electrical control whereby, in the event a glass wafer has not been placed on a spindle, neither the stem loader nor the press will operate when such spindle is moved successively to those stations. And, cooperating with the press is a gun or atomizer for projecting a fine spray of liquid against the mold thereon to prevent the adherence of glass to metal. It would be undesirable, however, to have the mold sprayed, at least for any length of time, while the press is not in operation, for instance, when the machine is being warmed up preparatory to operation, and a further object of the invention is the provision of means controlled by the press itself for shutting off this spray when the press is inoperative.

Another object of the invention is the provision of means associated with the press mechanism for automatically stopping the machine in the event of failure, for any reason, of the press to return after a downward stroke.

From the press, which is the final operation, except for the projection of air jets against the glass to cool it, the spindles move to an unloading station where the work piece is automatically lifted from the lower mold and deposited onto a discharge chute, and still another object of the invention is the provision of a cooling jacket on the press adjacent the mold whereby heating of the latter may be controlled.

A further object of the invention is the provision of gearing whereby one of the prepress members is driven from the common driving means for the spindles and at the same speed of rotation as the spindles.

A still further object of the invention is to provide a support and guiding means whereby the stems are held in true axial alignment with the spindles while traversing the zone from the stem loading station to the unloading station and in which zone the prepress and press members operate.

To these and other ends the invention consists of certain parts and combinations of parts as will be fully set forth in the following description and particularly defined in the appended claims.

The accompanying drawings, illustrating, as hereinabove stated, the invention as embodied in a machine used in the manufacture of radio receiving tubes for the assembly and sealing of an evacuation tube and terminal pins in the press member or header of a tube, and showing, also, the turret indexing means and particular spindle drive of the co-pending application of Stanley J. Gartner and Paul G. Pilkinton, Serial No. 635,889, filed December 19, 1945, which issued as Patent No. 2,588,977, March 11, 1952, are as follows:

Fig. 1 is a top plan view of the machine with parts broken away to show details of construction, and showing only such portions of the superstructure and parts surrounding the turret as may be necessary to illustrate in a general way the functions performed at successive stations to which the turret is indexed during its cycle.

Fig. 2 is a diagrammatic plan view indicating the stations at which the work-holding spindles are locked against independent rotation and certain other stations to which special reference will be made.

Fig. 3 is a view, drawn to a larger scale, showing a portion of the machine partly in side elevation and partly in vertical central section.

Fig. 4 is a sectional detail on line 4—4 of Fig. 3, the gears being shown in full.

Fig. 5 is a fragmentary view of the turret in side elevation and showing one of the work-holding spindles and associated parts.

Fig. 6 is top plan view of the parts seen in Fig. 5.

Fig. 7 is a longitudinal sectional view on line 7—7, Fig. 6, taken vertically through the spindle.

Fig. 8 is a transverse sectional detail on line 8—8 of Fig. 7.

Fig. 9 is a transverse sectional detail on line 9—9, Fig. 5.

Fig. 10 is an enlarged fragmentary view in elevation of a portion of the turret, the support upon which it is mounted to rotate, and the spindle drive mechanism.

Fig. 11 is a diagrammatic illustration in plan view of the chain drive for the spindles and showing, also, the arrangement of certain cam tracks the purpose of which will hereinafter be described.

Fig. 12 is a top plan view of the completed work piece.

Fig. 13 shows the work piece partly in elevation and partly in vertical central section.

Fig. 17 is an enlarged view partly in elevation and partly in vertical central section of most of the prepress mechanism seen in Fig. 14.

Fig. 18 is a top plan view of the parts illustrated in Fig. 17 but including a portion of the drive chain and with the gear box shown in section.

Fig. 19 is a view from the left of the upper part of the mechanism seen in Fig. 17, a portion of such view being in vertical section on line 19—19 of Fig. 18.

Fig. 20 is a view similar to Fig. 14 but showing the operating connections for the press, these two views being reversed with respect to each other.

Fig. 21 is an enlargement of the lower part of the mechanism seen in Fig. 20, this view being partly in elevation and partly in vertical central section.

Fig. 22 is a top plan view of the parts shown in Fig. 23.

Fig. 23 is an enlarged view in side elevation of the upper part of the mechanism shown in Fig. 20 and shows also the support for such mechanism.

Figs. 24A and 24B are diagrammatic illustrations of two positions of the glass stems in the stem setting operation.

Fig. 25 is an enlarged view partly in side elevation and partly in vertical central section of the press.

Fig. 26 is a transverse sectional view on line 26—26 of Fig. 25.

Fig. 27 is a sectional view on line 27—27 of Fig. 28.

Figs. 28 and 29 are elevation views at right angles to each other of the upper mold and its cooling jacket, the outer casing of the jacket being shown in section to more clearly bring out details of construction.

In the drawings similar reference numerals refer to similar parts throughout the several views.

Figure 15:
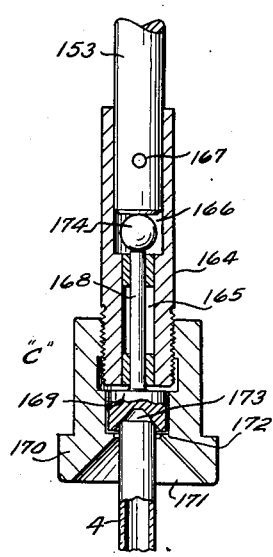
Figs. 15 and 16 are enlarged central sectional views taken vertically through the stem engaging heads of the two prepress or stem setting members.
Figure 16:
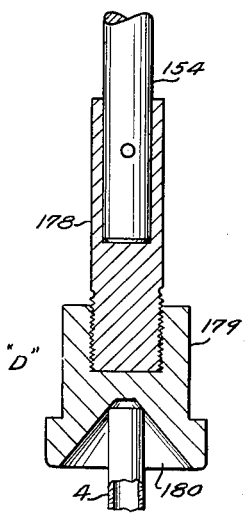
Figure 14:
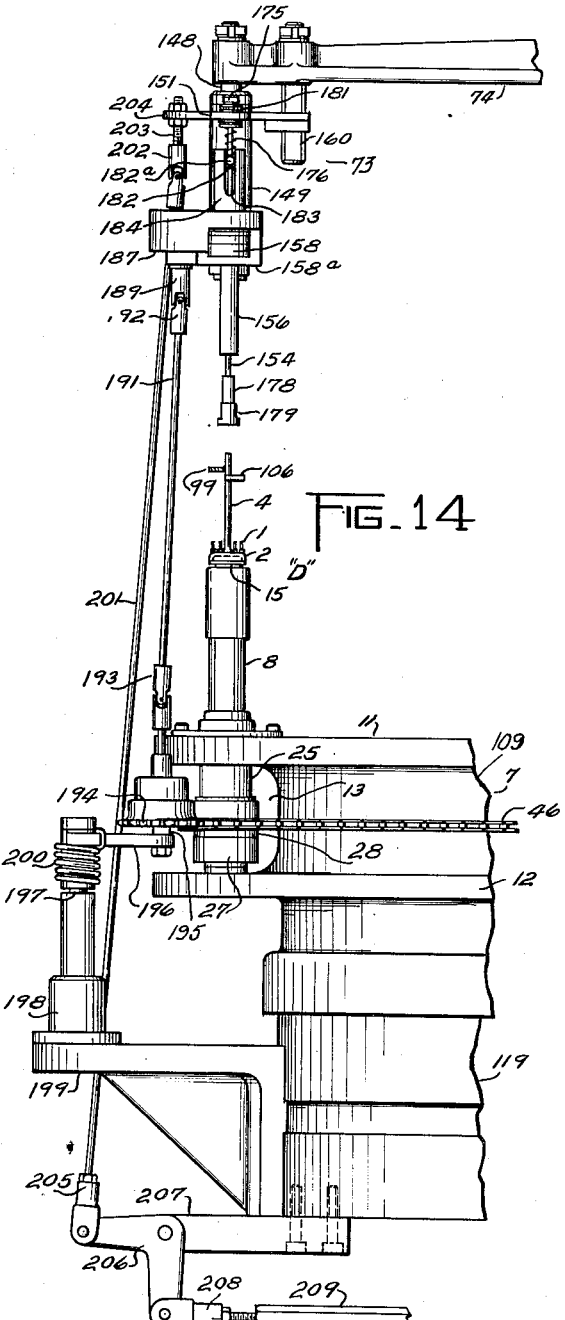
Fig. 14 is a view in elevation showing a portion of the turret and its support, and the operating connections for the prepress.

The work to be accomplished by the machine is, referring first to Figs. 12 and 13, the assembly and hermetical sealing of a plurality of terminal pins 1 in an inverted cup-shaped glass header which in use forms an end closure for an electronic tube of the type used in radio receiving sets and, further, the part to which this invention particularly appertains is, by fusing of the glass to attach integrally therewith a hollow glass stem upstanding from the header and through which the tube is evacuated, the stem later being sealed close to its inner end and the extra length cut off.

The header referred to is shown as a glass wafer or disc 2 having a central aperture 3 opening into the stem which comprises an elongated tubing 4. In a circle concentric with the opening 3 is a plurality of apertures for receiving the pins 1 while the peripheral edge of the disc is turned down to provide a depending, reinforcing flange 5 which later is joined with a cylindrical glass envelope to form the bottom portion thereof. Protuberances 6 surrounding the pins and formed during a pressing operation give additional support for the pins 1.

Regularly spaced angularly in a circle concentric with and adjacent the outer peripheral edge of a rotatable carrier which, in this instance, is a turret 7, is a plurality of spindles indicated generally by the numeral 8. These spindles, referring more particularly to Figs. 5 to 9, inclusive, are each mounted to rotate independently about a vertical axis on radial ball bearings 9 and 10 located in spaced horizontally extending top and bottom annular flanges 11 and 12, respectively, extending outwardly from the side wall of the turret 7 to form an outwardly opening channel 13.

Each spindle 8 is a tubular shaft and included in parts carried thereby and others associated therewith, as will hereinafter be described, is a closure member 14 inserted in its upper end and upon which is seated a cap or what will be hereinafter termed the lower mold 15 of a pair of press members, this mold being removably clamped in place by the interlocking engagement therewith of inturned segmental flange portions 16 of a sleeve 17 surrounding the shaft 8 and secured to shaft 8 by means of screws 18. An axial opening extends through the end closure 14 and the mold 15 for slidably receiving an axially movable rod 19, the reduced and tapered tip end 20 of which functions to maintain an opening at the juncture of the stem 4 and disc 2 when the glass is in molten condition and, further, to act with the upper press member in molding the parts at this point. And, in a circle concentric with the rod 19 and parallel therewith is a plurality of regularly spaced apertures 21 extending through both members 14 and 15 for receiving the terminal pins 1 and which register with the openings for such pins in the work piece 2.

Extending part way into the apertures 21 from their lower ends are slender rods 22 functioning both as stops and knockouts for the pins 1, these rods being secured at their lower ends in a collar 23 spaced below the end closure 14 and carried on the upper end of an axially movable sleeve 24 interposed between the center rod 19 and the wall of the spindle shaft 8. This sliding pin feature of the spindle construction is included in the subject matter of a copending application Serial No. 638,861, filed January 3, 1946. It may here be stated, however, that both the rod 19 and sleeve 24 extend below the shaft 8 and are actuated in the manner and by means to be described.

Fixed to the spindle shaft 8 by set screw 25ᵃ is an outer sleeve 25 comprising a spacer between the inner race members of bearings 9 and 10. This sleeve has a reduced portion to provide a shoulder 26 and interposed between the shoulder and an axially operable friction clutch 27 is a sprocket wheel 28. The clutch rotates with the spindle by being clamped to the outer sleeve 25 by screw 29, Fig. 9, and carries a fixed radially extending pawl 30 which, when engaged by one or another of the latches 31, 32, 33 or 34 at different operating stations as will be explained in connection with Fig. 2, effects a locking of the spindle against rotation while permitting free rotation of its respective sprocket wheel, the latter being driven by means now to be described, reference being had particularly to Figs. 1, 2, 3, 5, 7, 9, 10 and 11.

*Spindle drive*

An electric motor 35 adjustably mounted upon a frame part 36 affords driving connection through pulley 37, belt 38 and pulley 39 with the drive shaft 40 of a speed reducing unit 41 from which the driven shaft 42 extends vertically and through coupling 43 has driving connection with the shaft 44 on which is fixed the driving sprocket wheel 45 for a chain 46. This chain 46 lies in a horizontal plane and for the greater part of its length travels in the channel 13 formed between the turret flanges 11 and 12. It is in driving connection with all but a few of the spindle sprockets 28, the number of disengaged sprockets being determined by the location of an idler sprocket 47 and another idler 48 with both of which the chain is in mesh, the last named sprocket being carried on a stud in the free end of a chain tightener comprising an arm 49 pivoted at 50 and which by action of a coiled spring 49ᵃ, Fig. 10, holds the chain under proper tension.

Having set forth the construction, arrangement, and, to some extent, operation of the workholding spindles and before entering into a description of the press and prepress or stem setting mechanism which forms the particular subject matter of this invention, there will be described briefly the mechanism and function thereof at the successive stations to which the turret is indexed during its cycle.

*Associated mechanism*

With reference then particularly to Figs. 1, 2, 5 through 9 and 11, there is shown in plan view, Fig. 1, a plurality of hoppers 51 for separately containing a supply of terminal pins which may be of different lengths. These hoppers are supported upon a standard indicated at 52. A feed tube, not shown, for the pins 1 leads from each hopper and when a spindle 8 is at station A and locked against rotation, with the apertures 21 in registry with the feed tubes by engagement of its detent 30 with latch 31 (Fig. 2), mechanism is actuated, in this instance from a cam shaft 58, for feeding a pin 1 into each of the apertures 21 in the mold 15, such mechanism also including means not shown but which, at the next indexing of the turret, assures a positive seating of the pins 1.

From station A the particular spindle to which reference is being made is advanced counter clockwise by a succession of intermittent movements to station B. At several of the intervening stops between stations A and B the spindles 8, while not held against axial rotation, are not being positively driven due to their sprockets 28 being out of mesh with the chain 46. This is the leading zone where the operator by means of a pair of tongs picks up a preheated glass disc 2 from the discharge end of a chute or other source of work supply and places it on the mold 15 and over the pins 1 which are upstanding from the mold.

Station B is a pin unloading point in the cycle and the spindle 8 is there held against rotation by latch 32 which, in this instance, is actuated by a solenoid 32ª. In the event that no disc or wafer 2 has been placed on the mold 15, a spring pressed contact finger 59 (Fig. 1), determining the presence or absence of the glass piece 2, will cause the energizing of an electric circuit to effect the swinging into operative position of an arm 60 which carries means, not shown, for automatically withdrawing the pins and discharging them according to size into separate compartments, this unloading means forming additional subject matter of the hereinabove mentioned copending application Serial No. 638,861, filed January 3, 1946.

From station B to station C the spindles are intermittently advanced and while traversing this portion of the cycle, and independently rotating about their axes, the work thereon is heated by flames directed at it from burners, one of which is indicated at 61, these burners being supported by a segmental frame member 62 partly surrounding the turret and having control valves 63 whereby a proper admixture of gas, air, and oxygen is furnished through the supply pipes 64, 65 and 66.

At station C, where rotation of the spindle is not stopped, a stem 4 is placed endwise on the wafer 2 to which it is fused to become an integral part thereof, the stem being received from a supply hopper 67 by a carrier 68 which turns it to an upright position whence it is grasped by a spring-retractable pivoted arm 69 and swung to alignment with the axis of the spindle.

The second intermittent stop beyond station C is at station E where the spindle is locked against rotation by latch 33, in this instance cam actuated, and a press, indicated generally by numeral 70, Fig. 1, is carried by a fixed arm 71 extending radially from the center post 72 of the machine. This press includes an upper mold 53, as illustrated in Figs. 20, 23, and 25, which mates with the lower mold 15 to press the softened glass of wafer or header 2, thus molding the glass to form the protuberances 6 and effecting a sealing of glass to metal around the pins 1 and, in cooperation with the tapered end 20 of the rod 19, to shape the glass at the juncture of the stem 4 with the wafer. At the same time, acting in cooperation with the following spindles, a prepress member indicated generally at 73, Fig. 1, and carried by a fixed radial arm 74, has pressure pads or heads, as will be explained, acting against the ends of stems 4 at station C and at the intermediate stop D between stations C and E.

This press and prepress device being a part of the present invention will be hereinafter completely described.

From station E the work is intermittently advanced to station F where the spindle 8 is locked against rotation by spring pressed latch 34, and gripping fingers 75 clamp the stem 4 of the finished work-piece, lift the work off the mold 15 and, by means of a swinging arm 76 pivoted at 77 deposit it on a discharge chute, not shown. And, during the traverse of the spindle from the press to the unloading station the work may, for more rapid cooling, be subjected to the impingement of air from one or more jets 54. At the next stop, indicated at G and being the one intermediate the unloading station F and the starting or pin escapement or feeding station A, an atomizer 78, Fig. 1, is employed to spray the mold 15 with a solution which prevents adherence of the glass to the mold.

Spindle operation

Again referring to the spindle construction and to the fact that the telescoping center rod 19 and inner sleeve 24 are axially movable independently of each other, it will be observed also that the rod extends below the sleeve and is guided adjacent its lower end in the bushing 79 inserted in the bottom of the sleeve. This lower end of rod 19, as seen in Figs. 5 and 7, is threaded for axial adjustment into the inner race member of a radial ball bearing 80, the outer race of which carries trunnions 81 rotatably mounted in a ring portion 82 formed on the long arm of a lever 83 pivoted intermediate its ends at 84 to a bracket 85 carried by the turret 7 and acting against a torsional spring 86.

This lever 83, through action of the spring 86, acts to exert a downward pull on rod 19 so that its tip end 20 is normally below the top of the mold 15, at a position predetermined by axial adjustment of the rod. In the path of a roller 87 on the long arm of the lever 83 are, see Figs. 11, 5 and 7, spaced segmental cam tracks 88 and 89 which, when the roller rides thereon, rock the lever 83 against action of spring 86 to raise the rod 19 so that its tip end 20 extends above the mold 15, as indicated in Figs. 5 and 7, the rod being in this raised position during the stem loading and pressing operations so as to center the stem and maintain an opening therethrough and through the wafer 2 during the joining of these parts. The rod then drops and is again raised while its spindle is traversing the loading zone between stations A and B.

Likewise the lower end of sleeve 24 is threaded for axial adjustment of the sleeve through the inner race member of a radial ball bearing 90, the outer race of which is pressed into an arm 91 slidably supported on a rod 92 depending from the turret flange 12, the arm 91 being formed with a bracket portion 93 carrying a horizontally arranged stud 94 on which a roller 95 is mounted as illustrated in Figs. 5 and 7.

In the path of the roller 95 is a cam track concentric with the turret and comprising segmental portions 96, 97, and 98 (Fig. 11). At the pin loading station A roller 95 is not in engagement with a cam surface thus permitting the sleeve 24 to drop by gravity to its lowermost position, as seen in Fig. 7. When, however, at a predetermined point in the cycle of the turret the roller 95 engages cam segment 96, the sleeve 24 is raised, carrying with it the collar 23 and rods 22, the upper ends of the latter forming a predetermined level for the bottoms of the pins 1 or, in other words, determining the length of such pins below the header 2. A break in the cam track at station E permits these stop pins to drop while the press is in operation. A greater rise is provided in the cam track along segment 98 whereby the rods 22 function to assist in knocking out the pins from the mold 15 at the unloading station F and as cleanouts for the apertures 21 when the mold is being sprayed at station G. For a further description of the operation of the rods reference may be had to the hereinabove mentioned patent application Serial No. 638,861.

For the purpose of supporting the stems 4 coaxially with the spindle during traverse of the turret from the stem loading station C to the unloading station F a fixed segmental guide bar 99 is arranged between such stations and in a horizontal plane slightly below the upper ends of the stems. This bar, fragmentary portions of which are shown in Figs. 5 and 6, is indicated in phantom in Fig. 1 by broken lines in order to be less confusing. Cooperating with the curved bar 99 is a plurality of stem engaging members now to be described.

Adjacent each spindle 8, as illustrated in Figs. 5 and 6, and parallel therewith, is a shaft 100 mounted for rotary movement in bearings 101 and 102 carried by flange portions 11 and 12, of the turret 7. Fixed to the lower end of each shaft 100 is a two-armed lever 103 engaging, under the turret flange 12, the free end of the outwardly extending arm carrying a roller 104 which, while its respective spindle travels from a point just prior to its reaching the unloading station F to the pin unloading station B, engages a segmental cam track 105. Also fixed to the shaft 100 adjacent its upper end, and preferably in a plane slightly under the guide bar 99, is a longitudinally adjustable arm 106 having an open slot 107 adjacent its outer end to receive the stem 4 and hold it against the guide 99 in true axial alignment with the spindle 8. A spring 108 anchored at one end to the inner arm of lever 103 and at its other end to a fixed part normally holds the stem engaging arm 106 in operative position, as seen in Fig. 6, while, when roller 104 engages the cam track 105, shaft 100 is rotated to swing the arm 106 to open or inoperative position, movement of the arm between open and closed positions being indicated by the arrow in Fig. 6.

Turret mounting and indexing means

Although the spindles 8 may be mounted upon any preferred type of rotatable carrier having suitable driving connections and indexing means whereby the carrier is given regular intermittent rotary movement to successively bring the spindles into position for cooperation with the mechanism at the several operating stations, I have shown, in the illustrated embodiment of my invention, these parts of the machine as being those disclosed in the aforesaid copending patent application Serial No. 635,889 and which, briefly described, are as follows:

The turret 7, referring to Figs. 3 and 4, includes, besides the spaced horizontally arranged annular flanges 11 and 12 in which the spindles are mounted, a vertical wall portion 109 connecting the inner ends of these flanges, a bottom wall 110 terminating in a depending annular flange 111, an upstanding centrally disposed hub 112 and radially extending reinforcing ribs 113, and a plate 114 providing a cover for pockets formed by the ribs. Tapered roller bearings 115 support the turret upon a tubular stud member 116 which by screws 117 is secured to the top 118 of a table 119 which by inwardly extending lugs 120 is supported upon legs 121. Secured to the under side of the table top 118 is the cover plate 122 of a housing 123, and mounted in the plate 122 and bottom wall of the housing are radial ball bearings 124 and 125, respectively, in which is journalled a shaft 126 coaxial with the turret. Fixed to the shaft 126 are three plate cams 127, 128, and 129, a worm gear 130, and a helical gear 131. Supported upon a shelf 132 is an electric motor 133 which through a pulley 134 on its armature shaft and a belt 135 drives the pulley 136 on a horizontally disposed shaft 137 having bearings in the side wall of the housing 123. Fixed to the shaft 137 is a worm wheel 138 which drives the shaft 126.

Extending through the bottom wall 110 of the turret is a plurality of regularly spaced, circumferentially arranged studs 139, one for each spindle 8, and on the inner ends of which are hardened steel rollers 140.

A lever partly shown in Fig. 1 at 141 is mounted on a fixed part for oscillating movement in a horizontal plane. This lever is actuated by cam 127 and mounted thereon for reciprocating movement is a carriage member 142 having an open ended slot which permits it to slide into and out of engagement with the rollers 140. This carriage member 142 is actuated by cam 129 and with the lever 141 comprises the means for indexing the turret at regular time intervals a distance equal to the angular spacing between the spindles 8. And, mounted for reciprocating movement radially of the turret, is a second similarly slotted carriage member 143, Fig. 3, which, actuated by the cam 128, engages the rollers 140 to lock the turret against rotation during periods of rest alternating with the indexing movements.

The helical gear 131 drives a like gear 144 on shaft 58 which, as illustrated in Fig. 1, carries a plurality of cams, indicated generally by the numeral 146, which actuate a like number of rocker arms 147, these arms in turn effecting actuation of the instrumentalities at the several stations about the turret and including those for controlling operation of the stem setting and press mechanism now to be described. It may be added that the housing provides a chamber to be filled with oil in which run the gearing, cams, and indexing devices including the rollers 140, and that the bearings for the shafts 126, 137 and 58 are provided with suitable oil seals.

Stem setting and press mechanism

The center post 72, as illustrated in Fig. 3, extends upwardly from the turret supporting stud 116 to which it is rigidly secured. Fixed to this post and overhanging the turret is the arm 74 which carries the prepress or stem setting mechanism indicated generally at 73 in Fig. 1 and including the parts more clearly illustrated in Figs. 14 through 19.

Secured to the outer end of the arm 74 is a vertically extending bar 148 comprising a guide for a bushed sleeve 149 axially movable thereon. This sleeve 149 has opposing lateral extensions 150 to which an upper crosshead 151 is attached by screws 152. Through the outer ends of the crosshead 151 are openings for slidably receiving rods 153 and 154 extending parallel with the bar 148. These rods are guided for reciprocating movement in elongated bushed sleeves 155 and 156, respectively, which are removably attached by screws 157 to a lower fixed crosshead 158 rotatably adjustable on the lower end of the guide bar 148 to bring the rods 153 and 154 in axial alignment with the respective openings therefor in the movable upper crosshead 151, and locked in such position of adjustment by a set screw 159. A depending post 160 on the arm 74 engages through a slot in a tail piece extending from the crosshead 151 and thus acts as a guide for the latter in holding it against rotary displacement.

A collar 161 adjustable on the rod 153 supports the rod from the crosshead 151 and interposed between the latter and a second collar 162 adjustable on the rod is a very light coiled compression spring 163. Thus both the length of the rod below the plane of the crosshead and the spring tension may be predetermined. On the lower end of rod 153 is a tubular extension 164 formed with an axial bore 165 which terminates in a counterbore 166 (Fig. 15), the rod 153 extending part way into the latter and being secured to the extension by a pin 167. Rotatable in bushings in the bore 166 is the stem 168 of a work-engaging head 169 which in turn is free to rotate in the outer head or cap member 170 having threaded engagement with the member 164. Cap 170 is provided with an inner shoulder 172 for supporting the head 169 which is formed with a recess 173, as illustrated in Fig. 15, for locating and centering the upper end of the glass stem 4 in the first stem setting or prepressing operation. In order to guide the stem into recess 173 a countersink 171 is provided in the lower end of cap 170. A floating spherical member, as the ball 174, is interposed between the inner end of the stem 168 and the rod 153, and adjustment of the retaining cap 170 is such as to allow free rotation of the pressure head 169. Thus downward pressure may be exerted on the work and the latter permitted to rotate with little if any torsional strain.

Rod 154 is also supported from the crosshead 151 by a collar 175 on its upper end. The rod is encircled by a light coiled compression spring 176 for cushioning it against the work; it is guided in the elongated bushed sleeve 156 and has pinned to its lower end an extension 178 having threaded engagement with an axial adjustable head 179 formed in its end face with a conical recess 180 for centrally engaging the upper end of a glass stem 4. This rod 154, however, is mounted for rotation and, to that end, a thrust bearing 181 (Fig. 17) is interposed between the collar 175 and crosshead 151 and a like bearing between the crosshead and the spring 176, the collar 182 for supporting the latter being adjustably secured by set screw 55 to the rod and having opposing radial studs carrying rollers 182ª which engage in the vertical slots 183 of a sleeve 184 forming the hub of a spur gear 185 and whereby the rod is splined to the gear for relative axial movement. This gear 185 turns on needle bearings 186 mounted in a block 158ª on the fixed crosshead 158 within the housing 187. It is driven by a like gear 188 fixed to a stub shaft 189 also mounted in the crosshead 158 on roller bearings 190.

The shaft 189 is driven through the medium of an angularly disposed shaft 191 and universal couplings 192 and 193 by a sprocket wheel 194 in mesh with the chain 46 which drives the spindles 8. This sprocket wheel, engaging the outer face of the chain, has a ball bearing mounting on a stub shaft 195 upstanding from the free end of an arm 196 pivoted on a stud 197 in a support 198 mounted upon a bracket 199 carried by the table 119, the arm being actuated by a heavy coiled spring 200 to hold the sprocket wheel in mesh with the chain.

Reciprocation of the crosshead 151 and rods 153 and 154 carried thereby is by means of an angularly disposed rod 201 (Fig. 14) having a universal coupling 202 with a stud 203 depending from an extension 204 on the head and through a clevis 205 with one arm of a bellcrank 206 pivoted to a bracket 207 on the table 119, the other arm of such lever 206 having pivotal connection with a reciprocating rod 209 actuated by one of the cams 146 on shaft 58.

Functioning of the stem setting or prepass mechanism is as follows:

At station C the spring retractable arm 69 carries a glass stem or tube 4 into axial alignment with the inner rod 19 of a spindle 8, as illustrated in Fig. 24A, and into the guide slot 107 of the arm 106 associated with that spindle. In its movement to this position the tube 4 by engagement therewith of a spring retractable gate 210, see Fig. 1, opens the gate which permits the tube being positioned so as to rest against the inner peripheral edge of the segmental supporting member 99, of which the inner end of the gate forms a short continuation. Downward movement of the crosshead 151 and rods 153 and 154 brings the inner head member 169 into contact with the end of the tubing 4, as illustrated in Fig. 24A, and which by continued downward movement forces the tubing down so that its lower end centers on the tapered end 20 of spindle rod 19 (Fig. 24B). At this time, it will be understood, flames from burners 61 are playing on the glass disc 2 as they have been doing during traverse of the spindle through the heating zone from station B to station C and continue to do when the tubing is under the second prepress head 179 and the upper mold 53. At the downward setting movement of the tube or stem 4 the gripping fingers of the arm 69 are released and the arm returns to receive another tube. As hereinabove stated, the spindle 8 continues rotation at station C and, consequently, when the glass tube 4 contacts the rod end 20 it is frictionally driven thereby, this rotary movement being permitted without torsional strain on the glass tube by the provision which permits free rotation of the pressure head 169 and its stem 168.

Operating simultaneously with the rod 153 is the rod 154, the head 179 of which centers on the tube 4 at the next preceding spindle which is at station D. At this time both the disc 2 and the inner end of the glass tube 4 are in sufficiently molten condition as to fuse into one integral piece but which would be broken by any relative torsional strain. Therefore, as the head 179 engages the stem or tube 4 to set it into the disc it is being positively rotated by the means hereinabove described and at the same speed as that of the spindle. On return of the crosshead 151 to its upper position the turret is indexed one step thus moving the spindle with the work thereon from under the first prepress head 169 into position for operation thereon by the second head 179, and moving the preceding spindle with its work piece from under the second head to station E where the work is operated on by the press, which is illustrated in Figs. 1, 20, 21, 22, 23, and 25 through 29 and now to be described.

The outer end of the arm 71, fixed to the center post 72 and overhanging the turret, carries a bracket 211 adjustable lengthwise of the arm by conventional means indicated at 212 and formed with spaced upper and lower oil-sealed bearings 213 and 214 for slidably receiving an axially movable vertically extending tubular shaft 215. And, secured to the bearing 213 is a cylindrical housing 216 carrying a bracket having an overhanging arm 217 in which is threaded an adjusting screw 218 axially aligned with the shaft 215.

In the upper end of the shaft 215 is an internally threaded shouldered bushing 219 which is free to rotate but locked at 220 against axial movement. Within this bushing is the reduced, threaded upper end of an inner shaft 221 which, shorter than the outer shaft 215, is provided with an extension 222 having an axial bore having two parts 222a and 222b of different diameters. The smaller and upper part 222a communicates with a bore 223 of slightly greater diameter extending the length of the inner shaft part 221 while part 222b is of sufficient diameter to receive glass tube 4. The lower end of the extension 222 is reduced and threaded to receive the internally threaded hub part 224 of the upper mold 53 in which is a plurality of apertures 225 registering with like openings in the lower mold 15 for receiving the terminal pins 1. A rod 226 guided guided for axial movement in the bore of the shaft extension 222 extends upwardly through the bore in shaft 221 and on through a like bore in the adjusting screw 218. When the press is in its upper or inoperative position, as illustrated in Fig. 25, the rod 226 terminates just below the lower face of the mold 53. The rod is free to drop by gravity, for the purpose hereinafter to be described, and carries a weighted head 227 normally resting upon the adjusting screw 218.

The means for effecting reciprocation of the press members includes one of the rocker arms 147 pivoted at 228, Fig. 20, and actuated by a follower on one end thereof engaging one of the cams 146 on shaft 58. The other end of this arm 147 has a universal coupling 229 with the lower end of a vertically extending rod 230 guided in spaced bushings 231 pressed into a hollow shaft 232 which in turn is guided for axial movement in the spaced bushed bearings 233 secured to a bracket 234 extending outwardly from the table 119. The upper end of hollow shaft 232 has pivotal connection at 235 with one end of a longitudinally adjustable link 236 which at its upper end is pivotally connected at 237 to a clamp 238 attached to the tubular shaft 215 and movable in the space between bearings 213 and 214. The link 236 is provided with a shock absorber which, in this instance, comprises two sections 239 and 240 of the link movable relatively toward each other against the action of a plurality of circularly arranged coiled compression springs 241 contained within suitable housings 242 and 243.

The sliding rod 230 is formed with a ratchet tooth 244 to be engaged by a pawl 245 comprising one arm of a bellcrank 246. This lever is fulcrumed at 247 to a clamp 248 attached to hollow shaft 232 and normally held by a spring plunger 249, as illustrated in Fig. 21, with the pawl 245 in locking engagement with the tooth 244, shaft 232 being slotted at 250 to permit action of the pawl. The other arm of the bellcrank 246 is in yielding contact with one end of the spring retractable plunger 251 of a solenoid magnet 252 supported within a housing 253 attached to the bracket 234.

Downward movement of the plunger 251 trips the pawl out of engagement with the tooth 244 and rocks it forward against a stop 254 into a second operative position in which a detent 255 on the pawl enters an aperture 256 in the stop 254 which is a fixed lug carried by the bracket 234. In this second or forward position the pawl becomes the means for supporting the hollow shaft 232 in its uppermost position from bracket 234 while permitting independent reciprocation of the telescoped rod 230.

This downward movement of the solenoid plunger 251 also permits the closing, by a spring pressed reciprocating valve 257 operating in a block 258 mounted in the housing 253, of a communicating passage 259 in the pipe line 260 which supplies fluid to the spray gun 261 (see Figs. 1 and 23) for the upper mold, the passage being again opened when the plunger of the deenergized magnet moves upward.

Operation of the press which normally reciprocates in unison with the rods 153 and 154 of the prepress is as follows:

Assuming that a work piece is on the spindle 8 at the press station "E" and that the press is in its uppermost position, actuation of the rocker arm 147 will, through the universal coupling 229, cause a downward movement of the inner rod 230. The hollow shaft 232 will move downwardly simultaneously therewith through the medium of the clamp 248 attached to the hollow shaft and the pawl 245 carried thereby being engaged by the ratchet tooth 244. This movement of the hollow shaft 232 causes a downward operative movement of the tubular shaft 215 of the press proper through the link connection 236. Thus the opposing molds 15 and 53 are brought relatively into position to press the molten glass of the disc 2 to form the protuberances 6 around the pins 1 and shape the glass where the disc 2 and stem 4 are joined, the extensions of the terminal pins 1 above the disc entering the aligned apertures 225 in the upper mold. The lower end of the hollow shaft 232 abuts a shoulder 262 adjacent the lower end of the rod 230 and thus return movement of the latter effects a simultaneous lifting of the hollow shaft 232 and a consequent raising of the press to inoperative position. The actual pressing of the glass is cushioned by the shock absorber in the link 236.

Prior to operating the machine it is advantageous to warm it up by having the burners 61 functioning and the turret in rotation so as to preheat the molds 15. This should be done, however, without the press being in operation so as to prevent both undue heating of the upper mold and to shut off operation of the spray gun 261, the function of which is to spray the upper mold only between successive pressing operations.

As a further safeguard for the press, the hand wheel or knob 227 on the rod 226 normally engages a spring contact member 263 of a microswitch 264 supported upon the housing 216 as illustrated in Fig. 23 only. Rod 226 normally will not contact the end of a single glass stem 4. However, in the event of a glass stem 4 breaking off in the inner bore 222b of the press, and failing to drop out during the next indexing of the turret, the work piece on the succeeding spindle would, as the press started downward, engage the stem remaining in the inner bar and cause it to raise the rod 226 and release the contact spring 263 to effect the closing of a circuit through the solenoid 252 and thus stop the press. The rod 226, dropping by gravity to normal position when the mechanism has been relieved by the operator, acts as a stripper or knockout for the glass.

As a further safeguard against damage to the machine while in operation, a microswitch 265 is mounted upon the bracket 211 and carries a spring pressed follower 266 which, in downward movement of the press, is engaged by an actuating arm 267 carried by the clamp 238 on the tubular shaft 215. This actuates a plunger 268 in the switch to set up a supervisory electric circuit.

It is of further advantage in a press of the character and for the purpose described to control the temperature of the upper mold 53 and parts of the press adjacent thereto not only so that the glass will not adhere to the surrounding surfaces, but to prevent overheating of the oil seal in the bearing 214 and to assist in maintaining a desired molecular structural pattern of the glass as the work is cooled prior to its removal from the machine. To this end a cylindrical housing 269 is clamped to the tubular shaft 215 adjacent the mold 53 by screws 270. The wall of this housing is formed with horizontally arranged communicating channels 271 and 272 in which the cooling medium, in this instance air, is caused to circulate. An outer jacket 273 forms a closure for the open faces of these channels. Air inlet and outlet pipes are shown at 274 and 275.

It is necessary to provide a break in the guide bar 99 to permit up and down movement of the press. This opening is normally closed by a movable section of the bar comprising a foot piece 276 on the lower end of the vertical arm of a spring retractable lever 277 pivoted at 278 to the bracket 211. The other arm of the lever 277 extends at substantially right angles to the first named arm and has a plunger 279 on its free end operating in a dashpot 280. The inner side edge of the vertical arm is a cam surface engaged by a roller 281 mounted on a clamp 282 carried by the shaft 215. The lever is actuated to swing the foot piece 276 to open position as the press starts its downward movement, an adjustable stop screw 263 limiting the return movement which is cushioned by the plunger 279 in the dashpot 280. At station "E" the tube supporting arm 106, associated with the spindle 8 which normally coacts with guide bar 99 to align tube 4, is swung to an open position by engagement of its respective actuating arm 183 (Fig. 6) with a spring biased trip lever 285 indicated at station "E" in Fig. 11. As the turret is indexed to its next position, the trip lever 285 yields to allow arm 106 to return to its supporting position.

From the press station "E" the spindles 8 are successively moved to the unloading station "F" by the intermittent indexing of the turret. During this traverse the stems 4 are held by their respective supporting arms 106 against the guide bar 99 while air of predetermined temperature is directed against the glass from one or more jets 54, Fig. 1, to gradually cool it before being lifted from the mold 15 by the unloader.

Although I have shown and described particular embodiments of my invention, I do not desire to be limited to the embodiments described, and I intend in the appended claims to cover all modifications which do not depart from the spirit and scope of my invention.

What I claim is:

1. The combination, with a carrier, a plurality of spindles on said carrier regularly spaced along its line of feed, means for effecting a regular intermittent movement of said carrier a distance equal to the spacing of said spindles, means for independently rotating said spindles, a mold on each of said spindles formed to receive a glass work-piece having an aperture in axial alignment with the spindle, both mold and work-piece being rotatable with the spindle, means for heating said glass, and means associated with each of said spindles for slidably supporting a glass tubing, of a prepress including two work engaging members, one such member including a frictionally rotatable head operating to individually centralize said tubing with respect to said aperture and move it axially toward its respective spindle, the second of such members cooperating with an advanced spindle to press the prelocated tubing into contact with the heated glass on the mold of the spindle, means for rotating said second prepress member at the same speed as the spindle, a press cooperating with a still farther advanced spindle to shape the glass on its respective mold, means for independently locking said spindles against rotation at predetermined stations one of which is at said press, and actuating means for said prepress and said press.

2. The combination, with a turret mounted to rotate about a vertical axis, a plurality of vertically arranged spindles carried by said turret and regularly spaced on a circle concentric therewith, means for effecting the intermittent movement of said turret a distance equal to the angular spacing of said spindles, means for independently rotating said spindles, a mold on each of said spindles formed to receive a glass work-piece having an aperture in axial alignment with the spindle, both mold and work-piece being rotatable with the spindle, means for heating said glass during the traverse of said turret, means associated with each of said spindles for slidably supporting a glass tubing vertically above the spindle of a prepress including two work-engaging members, one such member including a frictionally rotatable head operating to individually centralize said tubing with respect to said aperture and move it axially toward its respective spindle, the other of said members cooperating with an advanced spindle to press the prelocated tubing in contact with the heated glass on the mold of the spindle, means for rotating said second prepress member at the same speed as the spindle, a press cooperating with a still farther advanced spindle to shape the glass on its respective mold, means for independently locking said spindles against rotation at predetermined stations one of which is at said press, and actuating means for said prepress and said press.

3. In a prepress and press mechanism, a support guided for reciprocating movement, a rod depending from said support and movable axilly therein, a fixed guide for said rod, a tubular extension on said rod, a freely rotatable stem locating inner head at the free end of said extension, an outer head threaded for adjustment on said extension and having an internal shoulder for rotatably retaining said inner head, a stem on said inner head rotatably borne in said extension, an antifriction bearing interposed between the upper end of said stem and said rod, a collar adjustable on said rod above and normally engaging said support, a second collar on said rod below said support, and a coiled compression spring interposed between said support and said second collar.

4. In a prepress and press mechanism, a support guided for reciprocating movement, a rod depending from said support, an elongated guide in which said rod is journalled for rotation and guided for reciprocating movement, thrust bearings for said rod and engaging opposing sides of said support, a collar on said rod normally engaging the upper one of said bearings, a second collar on said rod below said support, a coiled compression spring on said rod and interposed between said second collar and the lower one of said bearings, a tubular member surrounding said rod and mounted to turn on antifriction bearings in said guide and provided with longitudinally extending slots, studs extending laterally from said second collar and in antifriction contact with the side walls of said slots as a means whereby the rod is splined to said tubular member, a gear fixed to said tubular member, a second gear in mesh with said first named gear and mounted in said guide, and means for driving said second gear.

5. In a glass header manufacturing machine having a press member for forming said header, a prepress comprising a support, a crosshead guided for reciprocating movement on said support, two rods depending from said crosshead parallel to the direction of said reciprocating movement, an elongated fixed guide for each of said rods, a stem locating and engaging head freely rotable on one of said rods, a stem engaging head fixed to the other of said rods, two gears in mesh and mounted to rotate in the guide for said last named rod, the latter being splined to one of said gears, means for driving the other of said gears, spring means acting against each rod to hold the said head thereon in yielding engagement with a stem, and means for reciprocating said crosshead.

6. In a glass header manufacturing machine having a press member for forming said header, a prepress comprising a vertically extending post and a support for said post, an upper crosshead slidable on said post, means holding said crosshead against rotary movement, a lower crosshead fixed to said post at any position of rotary adjustment, two rods depending from said upper crosshead parallel to said post, an elongated guide on said lower crosshead for each of said rods, a stem locating and engaging head freely rotable on one of said rods, a stem engaging head fixed to the other of said rods, two gears in mesh and mounted to rotate in said lower crosshead, one of said gears being splined to the rod carrying said fixed head, means for driving the other of said gears, spring means acting against each rod to hold the said head thereon in yielding engagement with a stem, and means for reciprocating said upper crosshead.

7. In a machine for the purpose set forth, a press including a support, spaced bearings on said support, an outer tubular shaft guided for vertical reciprocation in said bearings, an inner shaft both ends of which are reduced and externally threaded, said inner shaft having an axial bore from its lower end for receiving a tubular stem, a mold threaded on the lower end of said inner shaft, a shoulder on said mold seating against the adjacent end of said outer shaft, a shouldered bushing in the upper end of said outer shaft in threaded engagement with said reduced upper end of said inner shaft and seated against the end of said outer shaft, a clamp on said outer shaft intermediate said bearings, and means engaging said clamp for reciprocating the press.

8. The combination of a press member guided for reciprocating movement, an operating rod also guided for reciprocating movement, automatically operable means for reciprocating said rod, means connecting said rod and said press member for reciprocating the latter, locking mechanism included in said connecting means, said mechanism, when in one position, providing means whereby reciprocation of said rod causes a reciprocation of said press and, when in another position, permitting reciprocation of said rod only and supporting said connecting means and said press in their uppermost positions, and means for actuating said locking mechanism.

9. A combination in accordance with claim 8 characterized by said means connecting said rod and said press member including resilient means for sustaining thrust exerted against said press member in the pressing operation.

10. The combination of a press member guided for reciprocating movement, a mold on said press member, a gun for projecting a fluid spray against said mold on each operation of said press member, a valve in the fluid connection to said gun, an operating rod guided for reciprocating movement, automatically operable means for reciprocating said rod, means connecting said rod and said press member for reciprocating the latter, locking mechanism included in said connecting means, said mechanism, when in one position, providing means whereby reciprocation of said rod causes a reciprocation of said press and, when in another position, permitting reciprocation of said rod only and supporting said connecting means and said press in their uppermost positions, a spring urging said locking mechanism toward said first named position, and a solenoid having a plunger engaging said locking mechanism for moving said locking mechanism upon energization of said solenoid to said second named position, and means for closing said valve on the energizing of said solenoid.

11. The combination, with a press member guided for vertical reciprocating movement, of means for effecting such movement comprising two telescoping shafts the outer one of which has a longitudinally extending slot, a support in which the outer one of said shafts is guided for vertical reciprocation, a link having pivotal connection at one end with the upper end of said outer shaft and at its other end with said press member, a shoulder adjacent the lower end of said inner shaft normally abutting the lower end of said outer shaft, a clamp on said outer shaft, a ratchet tooth cut in said inner shaft, a pawl pivoted on said clamp and operating in said slot, a detent on said pawl, a fixed part, spring means acting to normally hold said pawl in engagement with said tooth, means acting against said spring to disengage the pawl from said tooth and move said detent into locking engagement with said fixed part, and means connected to the lower end of said rod for effecting its reciprocating movement, said outer shaft moving with said inner shaft or being held in its uppermost position against sliding movement accordingly as said pawl engages said tooth or said detent thereon engages said fixed part.

12. In combination, a carrier, a plurality of vertically extending spindles on said carrier regularly spaced along its line of feed, means for effecting the intermittent movement of said carrier a distance equal to the spacing of said spindles, a mold on each of said spindles formed to receive the glass header of a tube and from which a glass tube is upstanding, a fixed bar above the plane of said carrier, a rod adjacent and parallel to each of said spindles, said rods being mounted to turn in bearings on said carrier, an arm fixed to each of said rods and formed in a side edge with an open ended slot of a depth equal to the diameter of said tubing and for receiving said tubing, spring means whereby said arm is normally held in an operative position to yieldingly hold the tubing in an upright position against said bar, a second arm on each of said rods, a follower on said arm, a cam track in the path of said follower, said cam track at predetermined stations effecting a rotation of said shaft to swing said tubing supporting arm to inoperative position.

13. In combination, a carrier, a spindle on said carrier mounted to rotate about a vertical axis and means for rotating said spindle, a mold on said spindle formed to receive a glass header, means for holding a glass tubing centered on and upstanding from said mold, means for heating the glass to permit fusing of said header and tubing to each other, a prepress member operating to exert end pressure on said tubing, said glass tubing holding means including a fixed bar along which said tubing travels in the movement of said carrier, and a finger pivotally carried on the carrier for releasably engaging said tubing and cooperating with said bar as a support for said tubing.

14. The combination in a machine for the purpose set forth, of a turret mounted to rotate about a vertical axis, a plurality of vertically arranged spindles regularly spaced in a circle concentric with said turret, means for effecting the intermittent rotation of said turret a distance equal to the angular spacing of said spindles, means for rotating said spindles, means for independently locking said spindles against rotation at predetermined stations, a lower mold on each of said spindles formed to receive a glass header, each of said molds having a central opening axially of said spindle and surrounding openings parallel to said central opening for receiving terminal pins, an axially movable centering pin in each spindle normally extending through the central opening of the mold, a stop in each spindle upon which said terminal pins are supported to extend through the mold and the glass header thereon, means for heating said headers during traverse of said turret, there being one station at which glass tubing is positioned above each of said headers, a prepress including two rods guided for reciprocating movement, a head freely rotatable on one of said rods and operating to locate said tubing on the centering pin in the spindle at another station, a head fixed on said other rod and engaging said tubing on the next preceding spindle to force its inner end into contact with the header on said spindle, means for rotating said second named rod at the same speed as the spindle, a press guided for reciprocating movement and including an upper mold cooperating with the lower mold on the second spindle preceding the one at said tube positioning station for shaping the glass of the header thereon, and means for effecting the reciprocation of said prepress and press during the interval of rest between movements of said turret.

15. A glass working machine including a movable carrier, a number of spindles on said carrier regularly spaced along the line of motion of said carrier, means for effecting a regular intermittent movement of said carrier a distance equal to the spacing of said spindles, means for independently rotating said spindles, means at predetermined stations along said line of motion for independently locking said spindles against rotation, a mold on each of said spindles formed to receive a glass work piece having an aperture in axial alignment with said spindle, means for heating said glass work pieces, means associated with each of said spindles for slideably supporting a glass tubing in axial alignment with said aperture and work members along said line of motion associated with a number of successive stations, the first of said work members acting to centralize said tubing with respect to said aperture and move it axially toward the spindle at the first of said stations, the second of said work members acting to press said tubing into the softened glass of said work piece, said second work member being arranged for independent rotation in the same sense and at the same speed as the spindle at the second of said stations, the third work member being a mold piece arranged for vertical reciprocation to press the glass of said work piece against said mold and having a central aperture adapted to receive said tubing.

16. In combination, an intermittently rotatable turret and plurality of vertical extending spindles regularly spaced around the rim of said turret, means for effecting intermittent indexing movement of said turret a distance equal to the spacing between said spindles, a mold on each of said spindles formed to receive the glass header of a tube from which a glass tube is upstanding, an arcuate fixed bar above the plane of said turret, a rod adjacent and parallel to each of said spindles, said rods being mounted to turn in bearings parallel to said spindles, an arm fixed to each of said rods and having in one side edge an open-ended slot of a depth equal to the diameter of said tube for receiving said tube, springs associated with each of said rods for normally holding said arm in an operative position to yieldingly hold the tube in an upright position against said arcuate bar, and means acting to swing said tube supporting arm to an inoperative position in predetermined positions of said turret.

STANLEY J. GARTNER.

REFERENCES CITED

The following references are of record in the file of this patent:

UNITED STATES PATENTS

| Number | Name | Date |
|---|---|---|
| 846,823 | Cazin | Mar. 12, 1907 |
| 1,547,393 | Higgins | July 28, 1925 |
| 1,593,825 | Higgins | July 27, 1926 |
| 1,655,141 | Fagan et al. | Jan. 3, 1928 |
| 1,742,153 | Stiles et al. | Dec. 31, 1929 |
| 2,063,235 | Eisler | Dec. 8, 1936 |
| 2,153,370 | Donovan et al. | Apr. 4, 1939 |
| 2,195,483 | Franke | Apr. 2, 1940 |
| 2,312,003 | Schneider et al. | Feb. 23, 1943 |
| 2,376,540 | Iden | May 22, 1945 |
| 2,410,345 | Hinkley | Oct. 29, 1946 |
| 2,452,652 | Hansen | Nov. 2, 1948 |